United States Patent Office 3,326,650
Patented June 20, 1967

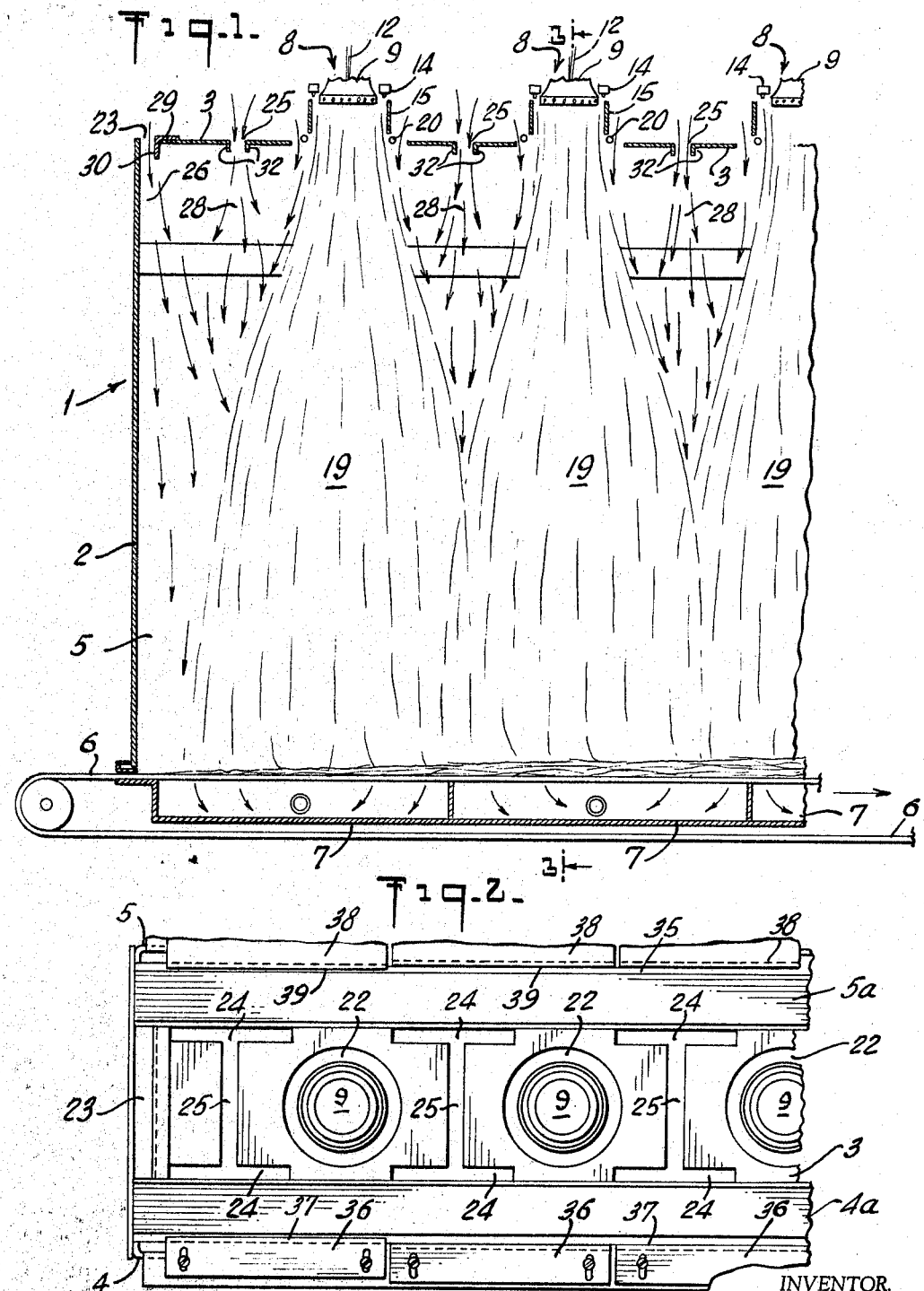

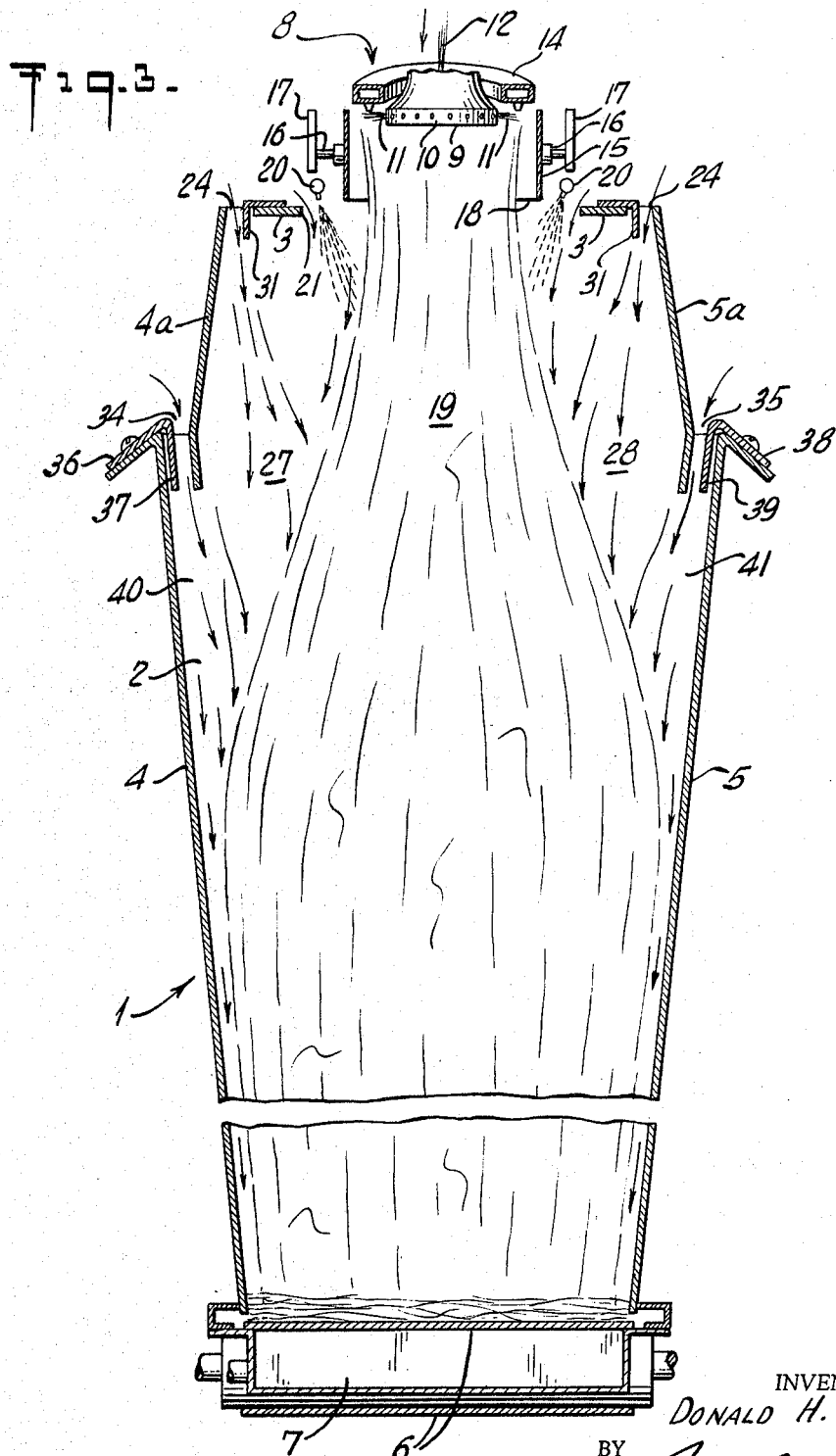

3,326,650
METHOD AND APPARATUS FOR USE IN
MANUFACTURING GLASS FIBERS
Donald H. Winn, Martinsville, N.J., assignor to Johns-Manville Corporation, New York, N.Y., a corporation of New York
Filed July 22, 1963, Ser. No. 296,715
15 Claims. (Cl. 65—3)

This invention relates to a collection chamber for fibrous materials and is particularly directed to a collection chamber for collecting glass fibers and to a method for maintaining the side walls of a collection chamber used in the collection chamber free from an undesirable accumulation of fibers.

One of the problems occurring during the formation of fibrous products, especially those products made from glass fibers wherein the fibers are coated with binder and collected in a collection chamber immediately adjacent the zone of fiberization, is the tendency for the binder coated fibers to stick to and accumulate on the side walls of the collection chamber. This problem is particularly troublesome in the system of producing glass fibers wherein the filaments of molten glass are centrifugally initiated and attenuated into fiber by a hot fluid blast moving in a direction substantially perpendicular to the direction of movement of the conveyor belt through the collection chamber. Immediately after attenuation, the fibers are coated with binder necessary for the manufacture of desired products. If the coated fibers are not acted on, there is a tendency for some of the fibers to move toward the side walls and stick thereto and accumulate thereon. If this accumulation of fibers on the side walls of the collection chamber is allowed to continue, it results in the formation of clumps of fiber which eventually become saturated with binder and periodically fall off the side walls to become integral with the felt of fibrous material being collected on an endless belt moving through the collection chamber. The presence of these clumps in the finished product results in the rejection of such products for many reasons, such as visual appearance, improper thermal conductivity, odor and handleability.

It is an object of the instant invention to provide a method for controlling the movement of fluid streams through a collection chamber to minimize the tendency for an undesirable accumulation of fiber on the walls thereof.

It is a further object of the instant invention to provide a construction for a collection chamber in which fluid streams may be effectively utilized to minimize the tendency for an undesirable accumulation of fibers on the walls thereof.

It is another object of the instant invention to provide for the uniform distribution of the fibers on the conveyor belt in the collection chamber by controlling the direction of the fiber stream moving through the collection chamber.

The foregoing objects are accomplished in accordance with the instant invention by the method utilizing a collection chamber which is provided with openings through which fluid streams, such as air, pass. The openings are so located that the fluid streams passing therethrough minimize the turbulence adjacent the peripheral boundaries of the fiber streams coming from the spinning apparatus and reduce the tendency of the binder coated fibers to move toward the sidewalls and adhere thereto. In the preferred embodiment of the invention, these openings are in the form of (1) an annular space located between a shield surrounding the spinning apparatus and controlling the direction of movement of the fiber stream and (2) openings formed in the top wall of the collection chamber and provided with means forming a nozzle so as to direct fluid streams moving downwardly into the collection chamber. The fluid stream passing through each annular space moves in substantially the same direction as the associated fiber stream and surrounds the peripheral boundaries of the fiber stream to reduce the tendency of the formation of eddy currents at the peripheral boundaries of the fiber stream. The openings in the top wall of the collection chamber are provided with means forming nozzles to create fluid streams of air moving at relatively high velocities downwardly into the collection chamber. These fluid streams are directed to contact the peripheral boundaries of the fiber streams at locations whereat the fiber streams are beginning to form undesirable eddy currents adjacent the peripheral boundaries thereof. The effect of these fluid streams is to form a layer of air surrounding the peripheral boundaries of the fiber streams and moving in substantially the same direction thereof so as to minimize the tendency for the formation of eddy currents adjacent the peripheral boundaries of the fiber stream which eddy currents, if allowed to form, would carry fibers from the fiber stream and into contact with the walls of the collection chamber. The collection chamber is further provided with means forming nozzles to direct fluid jets moving at relatively high velocities adjacent the end and side walls of the collection chamber in a direction substantially the same as the direction of movement of the fiber streams. These jet streams move at a velocity sufficient to resist the penetration thereof by any fibers which may escape from the fiber streams.

The invention will be more fully understood and further objects and advantages thereof will become apparent when reference is made to the following detailed description of a preferred embodiment of the invention and the accompanying drawing in which:

FIG. 1 is a side elevation of a diagrammatic illustration of a portion of a collection chamber of the type described in the instant application;
FIG. 2 is a top plan view of FIG. 1; and
FIG. 3 is an end elevation of FIG. 1 with the end wall removed.

Referring to the drawing, there is illustrated a portion of a system for the formation and collection of fibrous material and in particular for the formation and collection of glass fibers comprising a collection chamber 1 having an end wall 2, top wall 3 and side walls 4 and 5. The bottom of the collection chamber 1 is formed by an endless foraminous conveyor belt 6 moving in the direction indicated by the arrow and passing over a suction box 7. The spinning apparatus 8 comprises a rotatable disc 9 having an outer strip 10 having orifices therein and through which filaments 11 of molten glass from the stream 12 are formed by the centrifugal forces of the rotating disc which urges the glass from the stream 12 out through the orifices in the strip 10 in the form of filaments 11. The filaments 11 are attenuated into fine glass fibers by a hot gaseous blast 13 emanating from the burner 14. A generally annular shield 15 surrounds the zone in which the glass filaments 11 are attenuated into fiber. The shield 15 is mounted on shafts 16 mounted in trunnion supports 17 to allow for the tilting of the shield 15. As illustrated in the drawing, the shield 15 is mounted on the split shaft 16 for limited rotation about an axis which extends generally perpendicular to the direction of movement of the conveyor belt 6. The lower axial extremity 18 of the shield 15 terminates adjacent but spaced from the plane of the top surface of the top wall 3. The fibers formed by the attenuation of the filaments 11 of molten glass emerge from the shield 15 in the fiber stream 19. Binder means 20 adjacent the lower extremity 18 of the shield 15 is arranged to direct desired binder, such as a liquid phenolic resin, onto the fibers in the fiber stream 19.

Adjacent to the axial extremity 18 of the shield 15, the top wall 3 is provided with an opening 21 the diameter of which is slightly greater than the diameter of the shield 15 so as to form an annular space 22 between the shield 15 and the top wall 3. When suction is applied within the collection chamber 1 through the suction box 7, air is induced to flow through the annular space 22. The air passing through the annular space 22 moves substantially in the same direction as the fiber stream 19, forms a layer surrounding the fiber stream 19 and acts to minimize the tendency for the foration of eddy currents adjacent the peripheral boundaries of the fiber stream 19. In this manner, the fibers in the fiber stream 19 follow a controlled path until the velocity of the fiber stream and the surrounding layer of air has decreased to an extent that eddy currents are beginning to form. At this point, there is the probability of the fibers leaving the fiber stream and becoming attached to the side walls of the collection chamber. However, the instant invention provides another fluid stream to act on the fiber stream at this location to minimize the tendency for the formation of eddy currents adjacent the peripheral boundaries of the fiber stream.

The apparatus for providing these additional fluid streams is illustrated in the drawing and comprises a plurality of slots 23, 24 and 25 in the top wall 3 adjacent the end wall 2 and the upper portions 4a and 5a of the side walls 4 and 5 respectively. Air is induced through the slots 23, 24 and 25 by the action of the suction box 7 within the collection chamber 1 to form fluid streams 26, 27 and 28 moving in substantially the same direction as the fiber stream 19. One of the longer sides of the slots 23 is defined by the end wall 2 while its opposite side is defined by a plate 29 adjustably mounted on the top wall 3. The plate 29 has an extension 30 which projects downwardly into the collection chamber 1 to cooperate with the end wall 2 to form a nozzle opening inwardly into the collection chamber. One of the lower sides of the slots 24 is defined by the end wall 4a and 5a while the opposite sides thereof comprise an opening in the top wall 3 having a member 31 extending downwardly into the collection chamber 1 and cooperating with the side walls 4a or 5a to form a nozzle opening inwardly into the collection chamber. The greater axial length of the slots 24 extends generally in a direction substantially parallel with the direction of movement of the conveyor belt through the collection chamber. The slots 25 are formed by openings in the top wall 3, the sides of which have extensions 32 which cooperate with each other to form nozzles opening inwardly into the collection chamber. As illustrated in FIG. 2, the extremities of the slots 25 open into the slots 24 so as to form H-shaped openings in the top wall 3 and the greater axial length of the slots 25 extends generally in a direction substantially perpendicular to the direction of movement of the conveyor belt through the collection chamber. Because of the action of the nozzles adjacent the openings 23, 24 and 25, the fluid streams 26, 27 and 28 have the ability to retain their effective velocity for a relatively long time and thus are able to act on the peripheral boundaries of the fiber streams 19, at the locations mentioned above where the fiber streams 19 have lost velocity and because of this have a tendency to form eddy currents, to minimize the tendency for this formation of undesirable eddy currents.

The fiber stream 19 and its surrounding layer of air as provided by the fluid streams passing through the openings 22, 23, 24 and 25 proceed downwardly into the collection chamber 1 in the form of a diverging nozzle. After traveling a further distance into the collection chamber 1, the fiber stream 10 breaks into turbulence which is desirable for the collection of fiber on the conveyor belt 6. It is noted that the movement of the fiber is continued by the flow of such fiber with the volume air which moves through the air permeable conveyor belt 6 into the suction box 7. The undesirable accumulation of binder coated fibers on the side walls of the collection chamber 1 in this turbulent area is minimized by providing a plurality of slots 34 and 35 in the walls 4a and 5a. The suction in the suction box 7 induces a movement of fluid through the slots 34 and 35. One of the longer sides of the slots 34 is defined by the wall 4a while its opposite side is defined by one of a plurality of plates 36 adjustably mounted on the wall 4. Each plate 36 is formed with an extension 37 which projects downwardly into the collection chamber 1 to cooperate with the wall 4a to form a nozzle opening inwardly into the collection chamber. This nozzle is utilized to direct the fluid moving through the slot 34 for movement along the surface of the wall 4 in a direction generally parallel to the direction of movement of the fiber stream 19. One of the longer sides of the slots 35 is defined by the wall 5a while its opposite side is defined by one of a plurality of plates 38 adjustably mounted on the wall 5. Each plate 38 is formed with an extension 39 which projects downwardly into the collection chamber 1 to cooperate with the end wall 5a to form a nozzle opening inwardly into the collection chamber. This nozzle is utilized to direct the fluid moving through the slot 35 for movement along the surface of the wall 5 in a direction generally parallel to the direction of movement of the fiber stream 19. The greater axial lengths of the slots 34 and 35 extend generally in a direction substantially parallel with the direction of movement of the conveyor belt through the collection chamber. The fluid moving through the slots 34 and 35 comprise fluid jet streams 40 and 41 having a velocity sufficient to insure their continued flow adjacent the walls 4 and 5 are to resist penetration by the fibers from the fiber stream 19. In this manner, the jet streams 40 and 41 function to keep the side walls 4 and 5 free from an undesirable accumulation of fiber.

The relative sizes of the various components are dependent upon spinning apparatus 8, including the rotor or disc 9. Thus, for a rotor or disc 9 having a diameter of approximately 12 inches, the shield 15 of the instant application has a diameter from about 18 to 30 inches. The opening 20 in the top wall 3 has a diameter sufficient to provide an annular space 22 having a radial extent of from about 3 to 10 inches. In those instances where there is no annular space 22 or one of insignificant radial extent, the fluid stream for surrounding the fiber stream 19 flows through the annular space between the burner 14 and the top of the shield 15. The air passing through the annular space 22 moves at a velocity of from about 800 to 2500 feet per minute; the air moving in the fluid streams 26, 27 and 28, a velocity of from about 800 to 2500 feet per minute, and the air moving in the fluid jet streams 40 and 41, a velocity of from about 800 to 2500 feet per minute. It is understood that the foregoing description is given for purposes of illustration only and in no way limits the scope of the invention. Also, the term, glass fibers, as used in the instant application, includes fibers produced from mineral materials such as glass, slag, fusible rock or other natural occurring materials.

While the invention has been described in rather full detail, it will be understood that these details need not be strictly adhered to and that various changes and modifications may suggest themselves to one skilled in the art, all falling within the scope of the invention as defined by the subjoined claims.

What I claim is:

1. In apparatus for converting filaments of molten glass into fibers by spinning apparatus wherein said filaments of molten glass are centrifugally initiated and then attenuated into fibers by a fluid blast so as to produce a fiber stream moving in a predetermined direction, the improvement comprising:

(a) means defining a collection chamber adjacent said spinning apparatus and having means defining an opening in a top wall thereof and through which said fiber stream is directed,
(b) means defining a passageway between said spinning apparatus and said means defining said opening,
(c) means for moving a first fluid stream through said passageway in a direction substantially the same as the direction of movement of said fiber stream,
(d) means for moving a plurality of additional fluid streams within said collection chamber in a direction substantially the same as the direction of movement of said fiber stream, contacting the peripherial boundaries of said fiber stream and acting on the peripherial boundaries of said fiber stream to minimize the formation of eddy currents adjacent said peripherial boundaries,
(e) means for collecting said fibers from said fiber stream.

2. In apparatus for converting filaments of molten glass into fibers by spinning apparatus wherein said filaments of molten glass are centrifugally initiated and then attenuated into fibers by a fluid blast so as to produce a fiber stream moving in a predetermined direction, the improvement comprising:
(a) means defining a collection chamber adjacent said spinning apparatus and having means defining an opening in a top wall thereof and through which said fiber stream is directed,
(b) means defining a passageway between said spinning apparatus and said means defining said opening,
(c) means for moving a first fluid stream through said passageway in a direction substantially the same as the direction of movement of said fiber stream,
(d) means for moving a plurality of additional fluid streams within said collection chamber in a direction substantially the same as the direction of movement of said fiber stream, contacting the peripherial boundaries of said fiber stream and acting on the peripherial boundaries of said fiber stream to minimize the formation of eddy currents adjacent to said peripherial boundaries,
(e) means defining a pair of side walls for said collection chamber,
(f) means for moving at least one fluid jet stream adjacent each side wall of said collection chamber, with each of said fluid jet streams moving substantially in the same direction as said fiber stream and at a velocity sufficient to resist penetration thereof by fibers from said fiber stream, and
(g) means for collecting said fibers from said fiber stream.

3. Apparatus as defined in claim 2 wherein:
(a) said means for collecting said fibers from said fluid stream comprises a fluid permeable conveyor belt moving through said collection chamber, and further comprising:
(b) an annular shield surrounding said spinning apparatus,
(c) said shield being pivotally mounted for rotation about an axis which extends substantially perpendicular to the direction of movement of said conveyor.

4. In apparatus for converting filaments of molten glass into fibers by spinning apparatus wherein said filaments of molten glass are centrifugally initiated and then attenuated into fibers by a fluid blast so as to produce a fiber stream moving in a predetermined direction, the improvement comprising:
(a) means defining a collection chamber adjacent said spinning apparatus and having means defining an opening in a top wall thereof and through which said fiber stream is directed,
(b) means defining a pair of side walls for said collection chamber,
(c) means for moving at least one fluid jet stream adjacent each side wall of said collection chamber, substantially in the same direction as said fluid stream and at a velocity sufficient to resist penetration thereof by fibers from said fiber stream, and
(d) means for collecting said fibers from said fiber stream.

5. Apparatus as defined in claim 4 wherein:
(a) said means for collecting said fibers from said fluid stream comprises a fluid permeable conveyor belt moving through said collection chamber, and further comprising:
(b) an annular shield surrounding said spinning apparatus,
(c) said shield being pivotally mounted for rotation about an axis which extends substantially perpendicular to the direction of movement of said conveyor.

6. The method of manufacturing bonded glass fiber felts, including initiating, attenuating, collecting and bonding glass fibers into felts, comprising the steps of:
(a) centrifugally initiating filaments of molten glass from a rotary disc, and attenuating the filaments into glass fibers with a hot fluid blast emanating from a burner directed into a walled collection chamber toward a collection means;
(b) forming a fiber stream of the attenuated fibers with the hot fluid blast and moving the fiber stream into the walled collection chamber toward the collection means;
(c) applying binder to the fibers of the fiber stream;
(d) inducing an annular fluid stream downwardly directed into the walled collection chamber from above and surrounding the fiber stream of binder containing attenuated fiber and hot fluid blast, directing and controlling the path of the fiber stream to the collection means to minimize turbulence in the fiber stream;
(e) inducing a further fluid stream downwardly directed into the walled collection chamber adjacent the inner walls of the collection chamber and generally parallel to the fiber stream to resist penetration by the binder containing fiber of the fluid stream and fiber adherence to the chamber walls; and,
(f) collecting the binder containing attenuated fibers of the fluid stream with suction upon the collection means.

7. The method of manufacturing bonded glass fiber felts, including initiating, attenuating, collecting and bonding glass fiber into felts, comprising the steps of:
(a) centrifugally initiating filaments of molten glass from a rotary disc, and attenuating the filaments into glass fiber with a hot fluid blast emanating from a burner directed into a walled collection chamber toward a collection means;
(b) forming a fiber stream of the attenuated fibers with the hot fluid blast and moving the fiber stream into the walled collection chamber toward the collection means;
(c) applying binder to the fibers of the fibrous stream;
(d) inducing a fluid stream downwardly directed into the walled collection chamber from above and annularly spaced from and surrounding the fiber stream of binder containing attenuated fibers and hot fluid blast, directing and controlling the path of the fiber stream to the collection means to minimize turbulence in the fiber stream;
(e) inducing a second fluid stream downwardly directed into the walled collection chamber adjacent the inner walls of the collection chamber and generally parallel to the fibrous stream, to resist penetration by the binder containing fiber of the fluid stream and fiber adherence to the chamber walls;
(f) inducing a plurality of additional fluid streams spaced intermediate the said first annular fluid stream surrounding the fiber stream and the second fluid stream adjacent the inner chamber walls, and directing each of said additional fluid streams in substantially the same direction as the fluid stream sufficient to minimize the current eddies in the said fiber stream; and, (g) collecting the binder containing attenuated fibers of the fluid stream with suction upon the collection means.

8. The method of manufacturing bonded glass fiber felts, including initiating, attenuating, collecting and bonding glass fiber into felts, comprising the steps of:
(a) centrifugally initiating filaments of molten glass fibers from a rotary disc, and attenuating the filaments into glass fibers with a hot fluid blast emanating from a burner directed into a walled collection chamber toward a collection means;
(b) forming a fiber stream of the attenuated fibers with a hot fluid blast and moving the fiber streams into the walled collection chamber toward the collection means;
(c) applying binder to the fibers of the fiber stream;
(d) inducing a first fluid stream of air downwardly directed into the top of the walled collection chamber from above and annularly spaced from and surrounding the fiber stream of binder containing attenuated fibers and hot fluid blasts entering the collection chamber, the surrounding fluid stream acting upon the outer peripheral boundary of the fiber stream directing and controlling the path of the fiber stream to minimize turbulence in the moving fiber stream;
(e) inducing a second fluid stream of air downwardly directed into the walled collection chamber adjacent to the inner wall of the collection chamber and generally parallel to the fiber stream, to resist penetration by the binder containing fiber of the fluid stream and fiber adherence to the chamber walls;
(f) collecting the binder containing attenuated fibers of the fluid stream with suction upon the collection means.

9. The method of manufacturing bonded glass fiber felts, including initiating, attenuating, collecting and bonding glass fibers into felts, comprising the steps of:
(a) centrifugally initiating filaments of molten glass from a rotary disc, and attenuating the filaments into glass fibers with a generally annular hot fluid blast about the rotary disc emanating from a burner and directed into a walled collection chamber toward a collection means;
(b) forming a fiber stream of the attenuated fibers with the hot fluid blast and moving the fiber stream into the walled collection chamber toward the collection means;
(c) applying binder to the fibers of the fiber stream;
(d) inducing a first fluid stream of air downwardly directed into the walled collection chamber from above and annularly spaced from and surrounding the fiber stream of binders containing attenuated fibers and hot fluid blast, directing and controlling the path of the fiber streams to the collection means to minimize turbulence in the fiber stream;
(e) inducing a second fluid stream of air downwardly directed into the walled collection chamber adjacent the inner walls of the collection chamber and generally parallel to the fiber stream to resist penetration by the binder containing fibers of the fluid stream and fiber adherence to the chamber walls;
(f) inducing air in a plurality of additional fluid streams spaced intermediate the first annular fluid stream surrounding the fiber stream and the second fluid stream adjacent the inner chamber walls, and directing each of said additional fluid streams in substantially the same direction as the fiber stream sufficient to minimize the current eddies in the said fiber stream; and,
(g) collecting the binder containing attenuated fibers of the fluid stream with suction upon the collection means.

10. The method of manufacturing bonded glass fiber felts, including initiating, attenuating, collecting and bonding glass fibers into felts, comprising the steps of:
(a) contrifugally initiating filaments of molten glass from a rotary disc;
(b) applying a hot fluid blast emanating from a burner generally transversed the path of the centrifugally initiated filaments of molten glass and directed into a walled collection chamber toward a collection means, attenuating the filaments of molten glass into fibers and forming a fluid stream of the attenuated fibers in the hot fluid blast moving into the walled collection chamber towards the collection means;
(c) applying binder to the fibers of the fiber stream;
(d) inducing a first fluid stream of air downwardly directed into the walled collection chamber from above and annularly spaced from and surrounding the fiber stream of binder containing attenuated fibers in the hot fluid blast, directing and controlling the path of the fiber stream to the collection means to minimize turbulence in the fiber stream;
(e) inducing a second fluid stream of air downwardly directed into the walled collection chamber adjacent the inner walls of the collection chamber and generally parallel to the fiber stream to resist penetration by the binder containing fibers of the fluid stream and fiber adherence to the chamber walls;
(f) inducing air in a plurality of further fluid streams spaced intermediate the first annular fluid stream surrounding the fiber stream and the second fluid stream adjacent the inner chamber walls, and directing each of said further fluid streams in substantially the same direction as the fiber stream sufficient to minimize the current eddies in the said fiber stream; and,
(g) collecting the binder containing attenuated fiber of the fluid stream with suction upon the collection means.

11. An apparatus for the manufacture of bonded glass fiber felts, comprising:
(a) a fiber collection chamber defined and enclosed by a top wall, side and end walls and a bottom having a foraminous collection surface positioned over a suction box;
(b) fiberizing means mounted above the collection chamber comprising a rotary disc for the centrifugal initiation of filaments from molten glass and an adjacent burner for the attenuation of the filaments into glass fibers positioned to direct its hot fluid blast and attenuated fibers as a fiber stream downwardly into the collection chamber toward the collection surface;
(c) the top wall of the collection chamber being provided with an orifice positioned below the said fiberizing means to receive the fiber stream of hot fluid blast and attenuated fibers from the fiberizing means, said orifice extending beyond the fiberizing means providing an annular space surrounding the path of the fiber stream and permitting the passage of induced air moving in the same direction as and surrounding the fiber stream toward the collection surface;
(d) means for applying binder to the fiber stream positioned adjacent the top wall of the collection chamber; and,
(e) the said walls of the collection chamber being provided with orifices positioned to permit the passage of induced air in a direction generally parallel to the collection chamber side walls and to the fiber stream.

12. An apparatus for the manufacture of bonded glass felts, comprising:
(a) a fiber collection chamber defined and enclosed by a top wall, side and end walls and a bottom having a foraminous collection surface positioned over the suction box;

(b) fiberizing means mounted above the collection chamber comprising a rotating disc for the centrifugal initiation of filaments from molten glass and an adjacent burner for the attenuation of the filaments into glass fibers and positioned to direct its hot fluid blast and attenuated fibers as a fibrous stream downwardly into the collection chamber toward the collection surface;

(c) the top wall of the collection chamber being provided with an orifice positioned below the said fiberizing means to receive the fibrous stream of hot fluid blast and attenuated fibers from the fiberizing means, said orifice extending beyond the fiberizing means providing an annular space surrounding the path of the fibrous stream and permitting the passage of air moving in the same direction as and surrounding the fibrous stream to the collection surface;

(d) the top wall of the collection chamber being provided with a plurality of additional orifices permitting the passage of induced air in the same general direction of the fiber stream and positioned generally about the annular space surrounding the path of the fiber stream, to reduce the formation of current eddies of the fiber stream within the collection chamber; and, (e) the side walls of the collection chamber being provided with orifices positioned to permit the passage of induced air in a direction generally parallel to the collection chamber side walls and to the fiber stream.

13. An apparatus for the manufacture of bonded glass fiber felts, comprising:

(a) a fiber collection chamber defined and enclosed by a top wall, side and end walls and a bottom having a foraminous collection surface positioned over a suction box, said top wall being provided a fiber receiving orifice;

(b) fiberizing means mounted above the collection chamber comprising a rotating disc for the centrifugal initiation of filaments from molten glass and an adjacent burner for the attenuation of the filaments into glass fiber positioned to direct its hot fluid blast and attenuated fibers as a fiber stream downwardly into the collection chamber through the said fiber receiving orifice toward the foraminous collection surface;

(c) an annular shield aligned with and depending from the fiberizing means surrounding and confining the path of the fiber stream from the fiberizing means, said annular shield defining an annular space in the fiber receiving orifice of the collection chamber top about the path of the fiber stream and permitting the passage of induced air moving in the same direction as and surrounding the fiber stream in the collection chamber toward the foraminous collection surface;

(d) means for applying binder to the fiber stream positioned adjacent to the top wall of the collection chamber; and, (e) the side walls of the collection chamber being provided with orifices positioned to permit the passage of induced air in a direction generally parallel to the collection chamber side walls and to the fiber stream.

14. An apparatus for the manufacture of bonded glass fiber felts, comprising:

(a) a fiber collection chamber defined and enclosed by a top wall, side and end walls and a bottom having a foraminous collection surface positioned over a suction box, said top wall being provided with a fiber receiving orifice;

(b) fiberizing means mounted above the collection chamber comprising a rotating disc for the centrifugal initiation of filaments from molten glass and an adjacent burner for the attenuation of the filaments into glass fibers positioned to direct its hot fluid blast and attenuated fibers as a fiber stream downwardly into the collection chamber through the said fiber receiving orifice toward the foraminous collection surface;

(c) an annular shield aligned with and depending from the fiberizing means surrounding and confining the path of the fiber stream from the fiberizing means, said annular shield defining an annular space in the fiber receiving orifice of the collection chamber top about the path of the fiber stream and permitting the passage of induced air moving in the same direction as and surrounding the fiber stream towards the foraminous collection surface;

(d) means for applying binder to the fiber stream positioned adjacent the top wall of the collection chamber;

(e) the top wall of the collection chamber being provided with a plurality of additional orifices permitting the passage of induced air in the same general direction as the fiber stream and positioned generally about the annular space surrounding the path of the fiber stream, to reduce the formation of current eddies in the fiber stream within the collection chamber moving towards the foraminous collection surface; and, (f) the side walls of the collection chamber being provided with orifices positioned to permit the passage of induced air in a direction generally parallel to the collection chamber sidewalls and to the fiber stream.

15. The apparatus defined in claim 14 wherein the foraminous collection surface positioned over the suction box comprises a conveyor belt moving through said collection chamber and said annular shield surrounding the path of the fiber stream is pivotally mounted for rotation about an axis which extends substantially perpendicular to the direction of movement of the said conveyor.

References Cited
UNITED STATES PATENTS

| | | | |
|---|---|---|---|
| 2,881,471 | 4/1959 | Snow et al. | 65—9 XR |
| 2,936,480 | 5/1960 | Kleist | 65—6 |
| 3,177,275 | 4/1965 | Brenner. | |

DONALL H. SYLVESTER, *Primary Examiner.*

R. L. LINDSAY, *Assistant Examiner.*